(12) United States Patent
Suzuki et al.

(10) Patent No.: US 7,940,407 B2
(45) Date of Patent: May 10, 2011

(54) IMAGE FORMING APPARATUS, TERMINAL APPARATUS AND MANAGEMENT APPARATUS

(75) Inventors: Masahiro Suzuki, Tokyo (JP); Yoshiharu Tojo, Tokyo (JP); Yasuhiro Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1044 days.

(21) Appl. No.: 11/374,132

(22) Filed: Mar. 14, 2006

(65) Prior Publication Data

US 2006/0215221 A1 Sep. 28, 2006

(30) Foreign Application Priority Data

Mar. 18, 2005 (JP) ................... 2005-078937

(51) Int. Cl.
*G06F 3/12* (2006.01)
*G06K 15/00* (2006.01)

(52) U.S. Cl. ........... 358/1.15; 358/1.13; 358/1.16

(58) Field of Classification Search ........... 358/1.1, 358/1.9, 1.11–1.18
See application file for complete search history.

(56) References Cited

U.S. PATENT DOCUMENTS

| 6,333,790 B1 * | 12/2001 | Kageyama | 358/1.15 |
| 6,606,669 B1 * | 8/2003 | Nakagiri | 719/327 |
| 6,959,437 B2 * | 10/2005 | Schacht et al. | 719/321 |
| 2002/0140966 A1 * | 10/2002 | Meade et al. | 358/1.15 |
| 2003/0066066 A1 * | 4/2003 | Nguyen et al. | 717/178 |
| 2003/0123082 A1 * | 7/2003 | Hall et al. | 358/1.15 |

FOREIGN PATENT DOCUMENTS

| JP | 9-152946 | 6/1997 |
| JP | 10-63451 | 3/1998 |
| JP | 11-296325 | 10/1999 |
| JP | 2004-326603 | 11/2004 |

OTHER PUBLICATIONS

U.S. Appl. No. 11/374,324, filed Mar. 14, 2006, Suzuki, et al.

* cited by examiner

*Primary Examiner* — Thierry L Pham
(74) *Attorney, Agent, or Firm* — Oblon, Spivak, McClelland, Maier & Neustadt, L.L.P.

(57) ABSTRACT

An image forming apparatus that is connected to a terminal apparatus via a network is disclosed. The image forming apparatus includes: a receiving unit configured to receive a request for a plug-in list from the terminal apparatus, wherein the terminal apparatus sends the request in order to check consistency of a driver; and a transfer unit configured to transfer the plug-in list in the image forming apparatus to the terminal apparatus when receiving the request for the plug-in list.

9 Claims, 9 Drawing Sheets

IMAGE FORMING APPARATUS, TERMINAL APPARATUS AND MANAGEMENT APPARATUS

BACKGROUND OF THE INVENTION

1. Field of the Invention

The present invention generally relates to an image forming apparatus, a terminal apparatus and a management apparatus. More particularly, the present invention relates to an image forming system including a multifunctional machine (MFP) that includes an image forming apparatus function, a server that is the management apparatus, a mail server and the terminal apparatus such as a PC as a client that are connected to a network, and relates to the image forming apparatus that forms the system, and relates to the terminal apparatus and the management apparatus for updating the driver of the terminal apparatus.

2. Description of the Related Art

As a conventional technology relating to the method for updating the printer driver of the terminal apparatus such as a PC as a client connected to a network, a technology disclosed in Patent document 1 is known, for example. In this conventional technology, when a new printer is connected to a network, a computer on the network checks a printer driver installed for the newly connected printer. When the printer driver is not applicable for the printer, information that the printer driver is not applicable for the printer is displayed and an applicable printer is installed.

As another conventional technology, a technology disclosed in Patent document 2 is known. In this conventional technology, a computer connected to a network inquires about an usable printer on the network. Then, when a printer responds to the inquiry, the computer downloads and installs a printer driver for the printer.

[Patent document 1] Japanese Laid-Open Patent Application No. 10-63451

[Patent document 2] Japanese Laid-Open Patent Application No. 11-296325

In the aforementioned conventional technologies, a computer and the like on a network can install a driver of a printer on the same network. In addition, when a new computer is connected to a network, a driver of a printer on the network can be installed into the computer. However, the aforementioned conventional technologies do not consider installing a driver to be updated.

SUMMARY OF THE INVENTION

An object of the present invention is to provide an image forming apparatus, a terminal apparatus and a management apparatus for installing an updated printer driver or a driver such as a scanner driver into a terminal apparatus such as a PC connected to the network.

The object is achieved by an image forming apparatus that is connected to a terminal apparatus via a network, the image forming apparatus comprising:

a receiving unit configured to receive a request for a plug-in list from the terminal apparatus, wherein the terminal apparatus sends the request in order to check consistency of a driver; and a transfer unit configured to transfer the plug-in list in the image forming apparatus to the terminal apparatus when receiving the request for the plug-in list.

In the image forming apparatus, the driver may include a plurality of functions, and the plug-in list includes information for each of the functions.

In the image forming apparatus, a management apparatus may be connected to the network, and the image forming apparatus may further includes:

a download unit configured to download a plug-in program or a driver from the management apparatus; and an install unit configured to install the plug-in program or the driver downloaded by the download unit.

The object can be also achieved by a terminal apparatus connected to an image forming apparatus via a network, the terminal apparatus comprising:

a receiving unit configured to receive a plug-in list from the image forming apparatus;

a checking unit configured to check consistency between the plug-in list received by the receiving unit and a driver in the terminal apparatus; and a storing unit configured to store a result of checking performed by the checking unit.

In the terminal apparatus, the driver may include a plurality of functions, and the checking unit checks the consistency for each of the functions.

In addition, the terminal apparatus may further includes a display unit configured to display a function inconsistent with the plug-in list from the result of checking stored in the storing unit.

The terminal apparatus may include:

a download unit configured to download the driver from the image forming apparatus according to the result of checking; and an install unit configured to install the driver downloaded by the download unit.

Also, a management apparatus may be connected to the network, and the terminal apparatus may include:

a download unit configured to download a driver from the management apparatus according to the result of checking; and an install unit configured to install the driver downloaded by the download unit.

In addition, the object can be also achieved by a management apparatus connected to the image forming apparatus and the terminal apparatus via a network, comprising:

a management unit configured to store and manage a plug-in program or a driver that is necessary for the image forming apparatus or the terminal apparatus; and a transfer unit configured to send the plug-in program or the driver in the management unit to the image forming apparatus or the terminal apparatus when receiving a request for obtaining the plug-in program or the driver from the image forming apparatus or the terminal apparatus.

The present invention can be also configured as a method for updating a driver of terminal apparatus connected to an image forming apparatus via a network, wherein:

the terminal apparatus checks consistency between functions in the image forming apparatus and a driver in the terminal apparatus, and downloads a plug-in program or a driver from the image forming apparatus so as to install the downloaded plug-in program or the driver according to a result of the checking.

In addition, the present invention can be also configured as a method for updating a driver of a terminal apparatus connected to an image forming apparatus and a management apparatus via a network, wherein:

the terminal apparatus checks consistency between functions in the image forming apparatus and a driver in the terminal apparatus, and downloads a plug-in program or a driver from the management apparatus so as to install the downloaded plug-in program or the driver according to a result of the checking.

According to the present invention, the terminal apparatus and the user of the terminal apparatus can know that update of a driver such as a printer driver has been performed. Therefore, update of the driver in the terminal apparatus can be performed.

In addition, according to the present invention, a driver in the terminal apparatus used by the user can be automatically updated from the image forming apparatus or the management apparatus.

In addition, according to the present invention, update of the driver in the terminal apparatus can be performed even though the terminal apparatus and the user of the terminal apparatus do not know whether a plug-in program for updating the driver exists in the image forming apparatus or in the management apparatus.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the image forming system, the image forming apparatus, the terminal apparatus, the management apparatus and the method for updating the printer driver of the terminal apparatus are described in detail with reference to figures.

Figure 1:
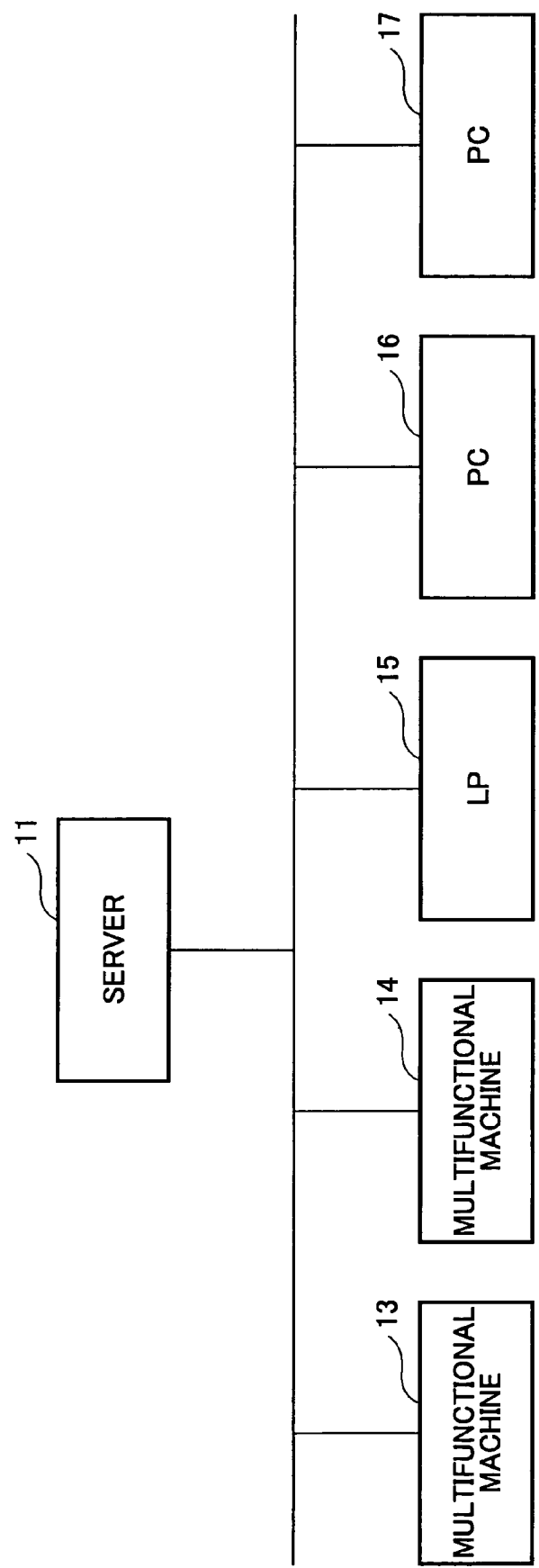
FIG. 1 is a block diagram showing a network configuration of an image forming system in an embodiment of the present invention.
Figure 2:
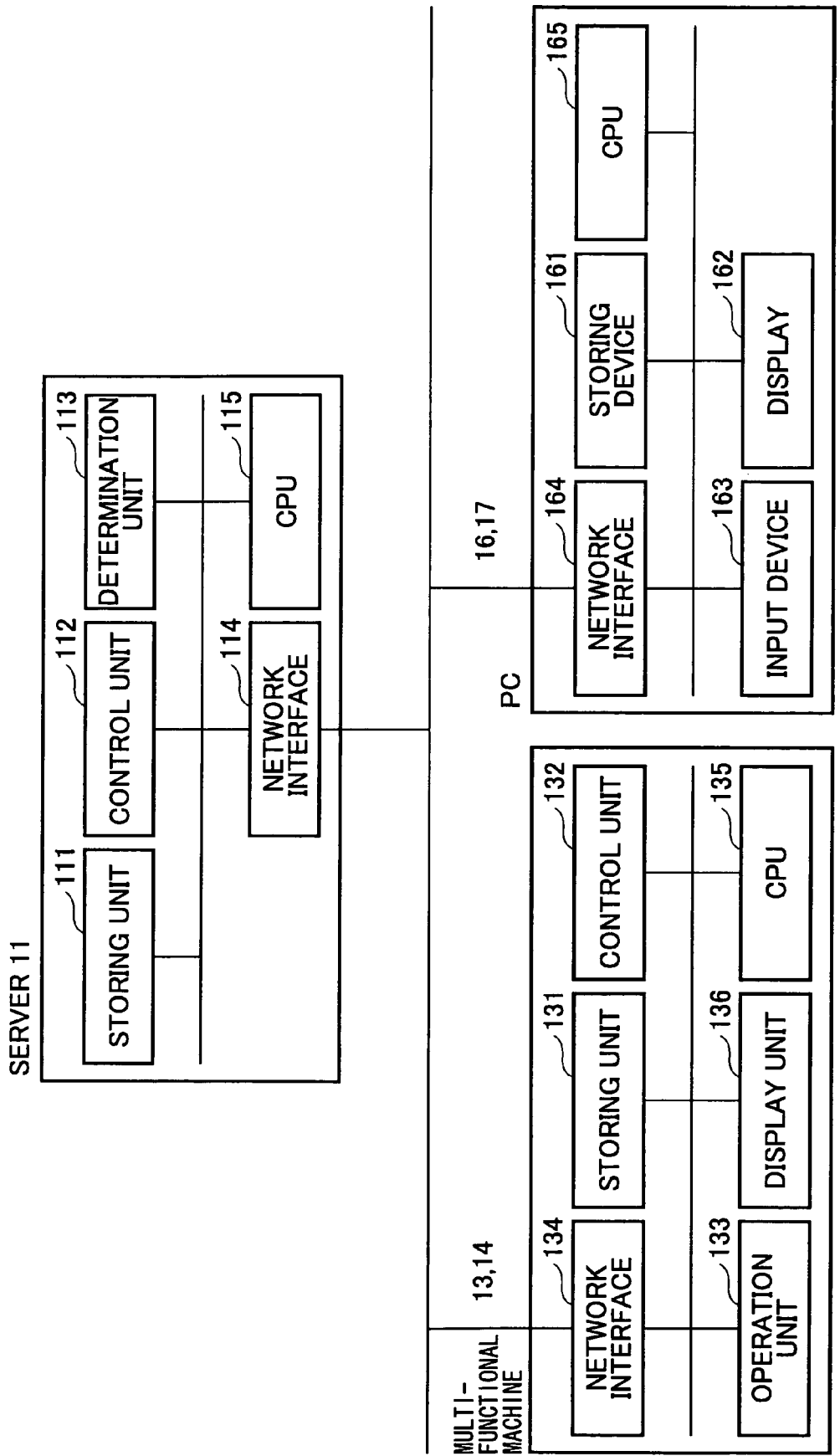
FIG. 2 is a block diagram showing configurations of apparatuses connected to a network of the image forming system.

FIG. 1 is a block diagram showing a network configuration of the image forming system in an embodiment of the present invention. FIG. 2 is a block diagram showing configurations of apparatuses connected to a network of the image forming system. In FIGS. 1 and 2, the reference number 11 indicates a server, 13 and 14 indicate multifunctional machines, 15 indicates a laser printer, 16 and 17 indicate PCs, 111 and 131 indicate storing units, 112 and 132 indicate control units, 113 indicates a determination unit, 114, 134 and 164 indicate network interfaces, 115, 135 and 165 indicate CPUs, 133 indicates an operation unit, 136 indicates a display unit, 161 indicates a storing device, 162 indicates a display, and 163 indicates an input device.

The image forming system of the embodiment of the present invention includes a download server (to be simply referred to as a server hereinafter) 11, a plurality of multifunctional machines 13 and 14, the laser printer 15, and PCs that are connected to the network.

The server 11 is a management apparatus for storing and managing plug-in programs, printer drivers and a list of the plug-in programs (to be simply referred to as a plug-in list hereinafter). Each of the multifunctional machines 13 and 14 performs plural functions such as an image forming apparatus function a scanner function and the like. The laser printer 15 performs only printing. The PC is a terminal apparatus that is an information processing apparatus used by a user.

In the image forming system configured as mentioned before, each of the PCs 16 and 17 includes a printer driver. Therefore, by selecting one of the multifunctional machines 13, 14 and the laser printer 15 and by sending an instruction, the PC can cause the machine to print a necessary document.

In the image forming system shown in FIG. 1, the server 11 includes the storing unit 111, the control unit 112, the determination unit 113, the network I/F 114 and the CPU 115. The server 11 receives an instruction or a request from another apparatus via the network I/F 114. The determination unit 113 determines the instruction or the request so that the server 11 sends a plug-in list, a printer driver, a plug-in program and the like to a source of the request.

The multifunctional machine includes multiple functions such as the image forming apparatus, the scanner and the like, and further includes an information processing function. As shown in FIG. 2, the multifunctional machine includes the storing unit 131, the control unit 132, the operation unit 133, the network I/F 134, the CPU 115 and the display unit 136. The multifunctional machine can perform copy operation based on an instruction from a user using the operation unit 133, or can print a document and the like based on an instruction from the PC 16, 17 input via the network I/F 134.

Each of the PCs 16 and 17 is a terminal apparatus for information processing used by an individual user, and includes a storing unit 161, a display 162, an input device 163, a network I/F 164 and a CPU 165 as shown in FIG. 2.

The plug-in list stored and managed by the server 11 is updated when a function of a printer driver is changed. The plug-in list includes information for each function of a printer driver that including a plurality of functions.

Figure 3:
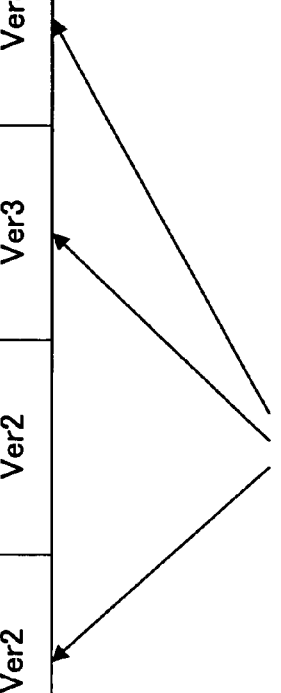
FIG. 3 is a figure for explaining determination for consistency between the printer driver stored in the PC and functions of the multifunctional machine according to an embodiment of the present invention.

FIG. 3 is a figure for explaining a determination method for determining consistency between the printer driver stored in the PC and functions of the multifunctional machine according to an embodiment of the present invention. The determination method is described with reference to FIG. 3.

As described before, the printer driver includes a plurality of functions, so that each function can be updated (using a plug-in program, for example). As shown in the example of FIG. 3, the printer driver includes a plurality of functions of function A-function F. It is assumed that versions of the functions A-F of the printer driver of the PC are Ver1, Ver1, Ver2, Ver1, Ver2, Ver1 respectively. On the other hand, a version of a function of the multifunctional machine (13 or 14) is updated when the function is updated. In the example shown in FIG. 3, versions of the functions A-F in the multifunctional machine are Ver1, Ver2, Ver2, Ver3, Ver3, Ver1 respectively due to updating and the like.

In the example shown in FIG. 3, each printer driver of the PC and the multifunctional machine is configured by the functions A-F. However, when a new function is added to the printer driver in the multifunctional machine, for example, when a function G of Ver1 is added, there may be a case where the printer driver in the PC does not have the function.

In after-mentioned operation in this embodiment of the present invention, the PC obtains, from the multifunctional machine, a plug-in list including version information for each function of the printer driver in the multifunctional machine. Then, the PC compares the version information with version information of the printer driver of the own PC so as to check consistency between functions of the printer driver of the PC and functions of the multifunctional machine. Then, the PC obtains a corresponding function as necessary.

Figure 4:
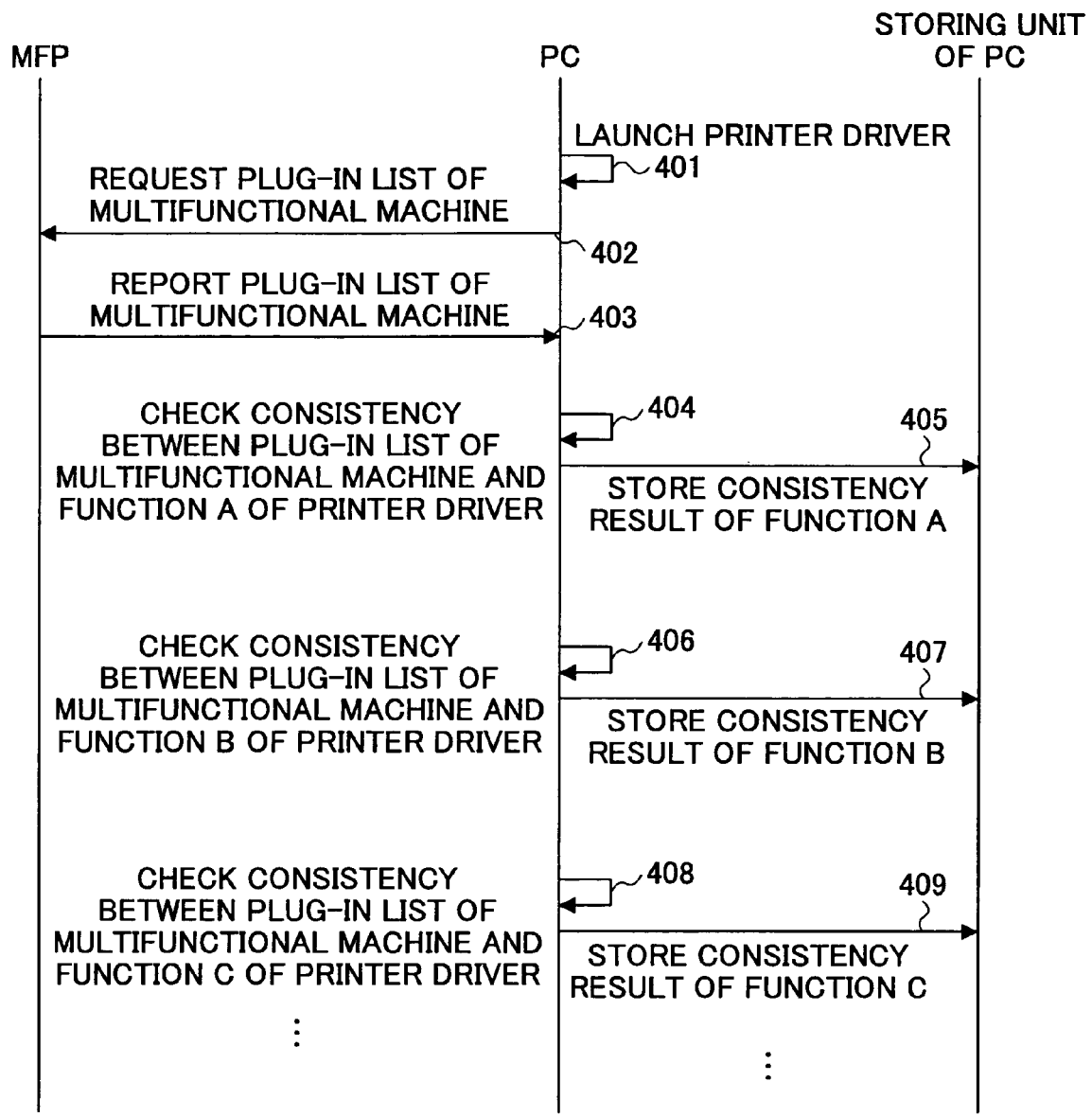
FIG. 4 is a sequence chart for explaining a first example of operation in an embodiment of the present invention.

FIG. 4 is a sequence chart for explaining a first example of operation in this embodiment of the present invention. The operation is described with reference to FIG. 4 in the following.

(1) First, the user instructs the own PC to perform printing in order to cause the multifunctional machine to perform printing so that the printer driver is launched (sequence 401).

(2) When the printer driver is launched, the PC sends, to the multifunctional machine, a request for a current plug-in list of the multifunctional machine to check whether update of the functions has been performed (sequence 402).

(3) When the multifunctional machine receives the request for the plug-in list from the PC, the multifunctional machine sends the plug-in list in the multifunctional machine to the PC, where the plug-in list includes versions: Ver 1, Ver 2, Ver 2, Ver 3, Ver 3, and Ver 1 for the functions A-F of the multifunctional machine as described in FIG. 3 (sequence 403).

(4) When the PC receives the plug-in list from the multifunctional machine, the PC compares information in the plug-in list with each function of the printer driver currently installed in the PC in order beginning with the function A, so as to check whether they are consistent, that is, whether the versions of corresponding functions are the same, or whether the version of the function of the PC is newer than the version of the corresponding function of the multifunctional machine (sequences 404, 406, 408, . . . ).

(5) When there is an inconsistent function as a result of the checking in sequences 404, 406 and 408, the PC stores information indicating that there is inconsistency into the storing unit in the PC. In the case shown in FIG. 3, since the functions B, D and E are inconsistent with the corresponding functions, these functions are stores as being inconsistent (sequences 405, 407, 409, . . . ).

According to the aforementioned processing, the PC can know that update of functions has been performed in the multifunctional machines.

Figure 5:
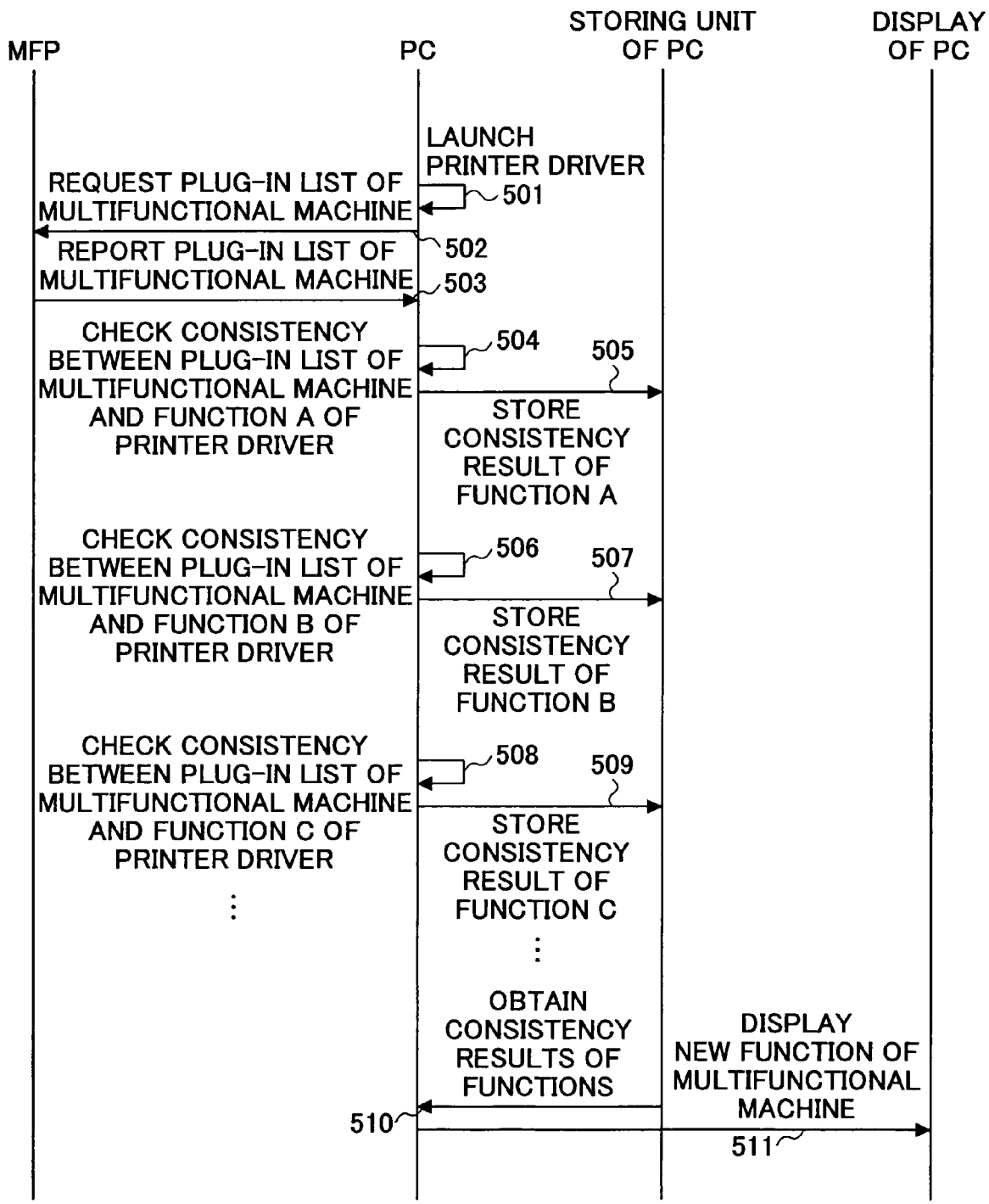
FIG. 5 is a sequence chart for explaining a second example of operation in an embodiment of the present invention.

FIG. 5 is a sequence chart for explaining a second example of processing operation in this embodiment of the present invention. The operation is described with reference to FIG. 5 in the following.

(1) First, the user instructs the own PC to perform printing in order to cause the multifunctional machine to perform printing so that the printer driver is launched (sequence 501).

(2) When the printer driver is launched, the PC sends, to the multifunctional machine, a request for a plug-in list of currently plugged-in functions in the multifunctional machine to check whether update of the functions has been performed (sequence 502).

(3) When the multifunctional machine receives the request for the plug-in list from the PC, the multifunctional machine sends the plug-in list in the multifunctional machine to the PC, where the plug-in list includes versions: Ver 1, Ver 2, Ver 2, Ver 3, Ver 3, and Ver 1 for the functions A-F in the multifunctional machine as described in FIG. 3 (sequence 503).

(4) When the PC receives the plug-in list from the multifunctional machine, the PC compares the plug-in list with each function of the printer driver currently installed in the PC in order beginning with the function A, so as to check whether they are consistent, that is, whether the versions of corresponding functions are the same, or whether the version of the function of the PC is newer than the version of the corresponding function of the multifunctional machine (sequences 504, 506, 508, . . . ).

(5) When there is an inconsistent function as a result of the checking in sequences 504, 506 and 508, the PC stores information indicating that there is inconsistency into the storing unit in the PC. In the case shown in FIG. 3, since the functions B, D and E are inconsistent with the corresponding functions, these functions are stored as being inconsistent (sequences 505, 507, 509, . . . ).

The operation so far is the same as the case of the sequences 401-409 in FIG. 4.

(6) In the aforementioned processing, the PC performs comparison for every function and stores inconsistent functions in the storing unit. After that, the PC obtains information on the stored inconsistent functions so as to display the information on the display of the PC to prompt the user to update the printer driver (sequences 510, 511).

According to the aforementioned processing, the user using the PC can know that update of functions has been performed in the multifunctional machine, and can update the printer driver.

In the first and second examples of operation in the embodiment of the present invention, the multifunctional machine may have or may not have the printer driver itself. The printer driver may be stored and managed by a server and the like.

Figure 6:
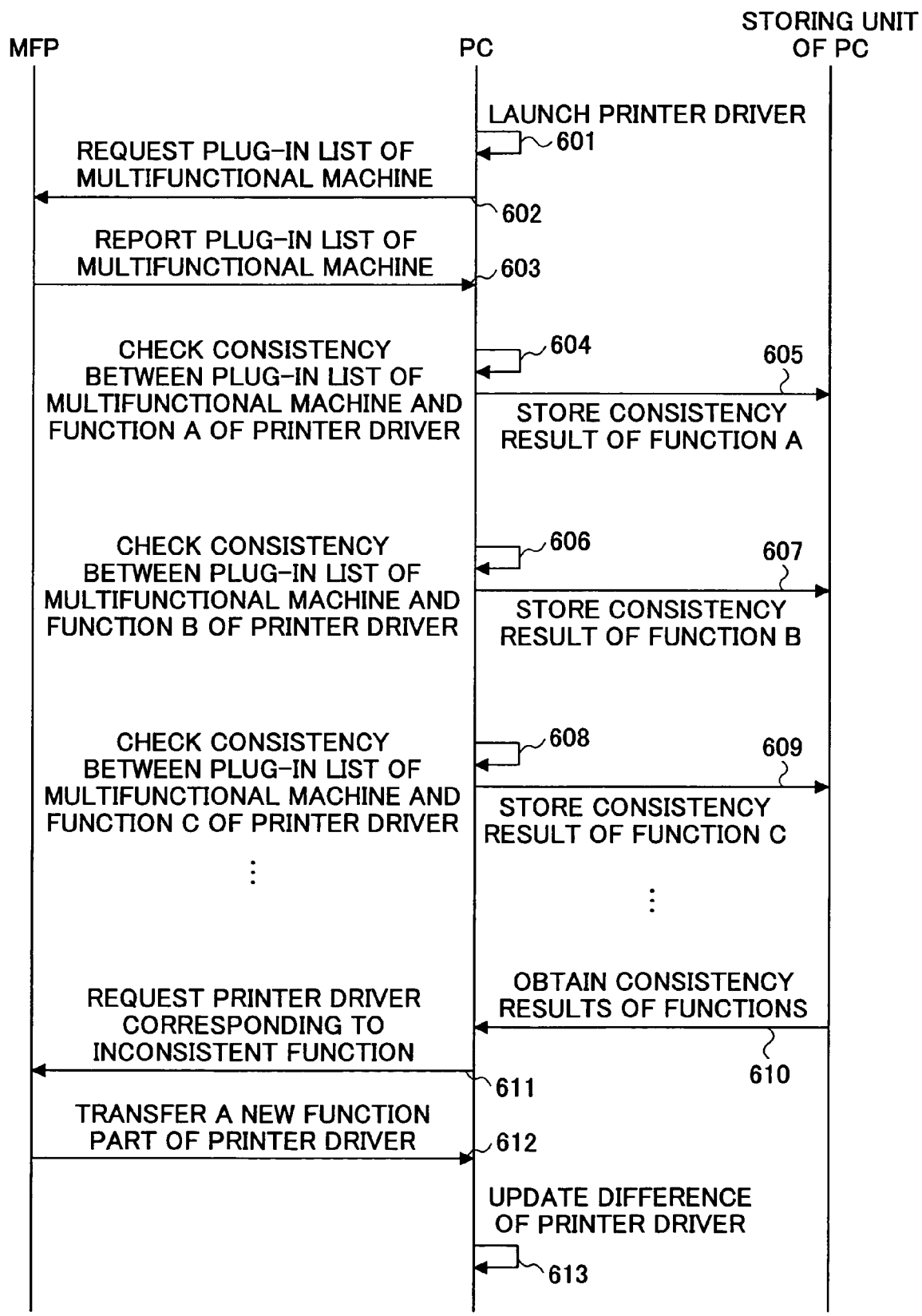
FIG. 6 is a sequence chart for explaining a third example of operation in an embodiment of the present invention.

FIG. 6 is a sequence chart for explaining a third example of operation in this embodiment of the present invention. The operation is described with reference to FIG. 6 in the following. In this example, it is assumed that the multifunctional machine has the printer driver itself.

(1) First, the user instructs the own PC to perform printing in order to cause the multifunctional machine to perform printing so that the printer driver is launched (sequence 601).

(2) When the printer driver is launched, the PC sends, to the multifunctional machine, a request for a plug-in list of currently plugged-in functions in the multifunctional machine to check whether update of the functions has been performed (sequence 602).

(3) When the multifunctional machine receives the request for the plug-in list from the PC, the multifunctional machine sends the plug-in list in the multifunctional machine to the PC, where the plug-in list includes versions: Ver 1, Ver 2, Ver 2, Ver 3, Ver 3, and Ver 1 of the functions A-F in the multifunctional machine as described in FIG. 3 (sequence 603).

(4) When the PC receives the lug-in list from the multifunctional machine, the PC compares the plug-in list with each function of the printer driver currently installed in the PC in order beginning with the function A, so as to check whether they are consistent, that is, whether the versions of corresponding functions are the same, or whether the version of the function of the PC is newer than the version of the corresponding function of the multifunctional machine (sequences 604, 606, 608, . . .).

(5) When there is an inconsistent function as a result of the checking in sequences 604, 606 and 608, the PC stores information indicating that there is inconsistency into the storing unit in the PC. In the case shown in FIG. 3, since the functions B, D and E are inconsistent with the corresponding functions, these functions are stored as being inconsistent (sequences 605, 607, 609, . . . ).

The operation described so far is the same as the case of the sequences 401-409 in FIG. 4.

(6) In the aforementioned processing, the PC performs comparison for every function and stores inconsistent functions in the storing unit. After that, the PC obtains information on the stored inconsistent functions (sequence 610).

(7) After that, the PC requests the multifunctional machine to transfer a program for plugging-in a difference, in the printer driver, corresponding to the inconsistent functions (sequence 611).

(8) When the multifunctional machine receives the request in the sequence 611, the multifunctional machine sends, to the PC, the program for plugging-in the difference of the printer driver corresponding to the inconsistent functions (sequence 612).

(9) The PC updates the printer driver in the PC using the transferred program (sequence 613).

According to the aforementioned processing, the printer driver in the PC used by the user can be automatically updated from the multifunctional machine.

Figure 7:
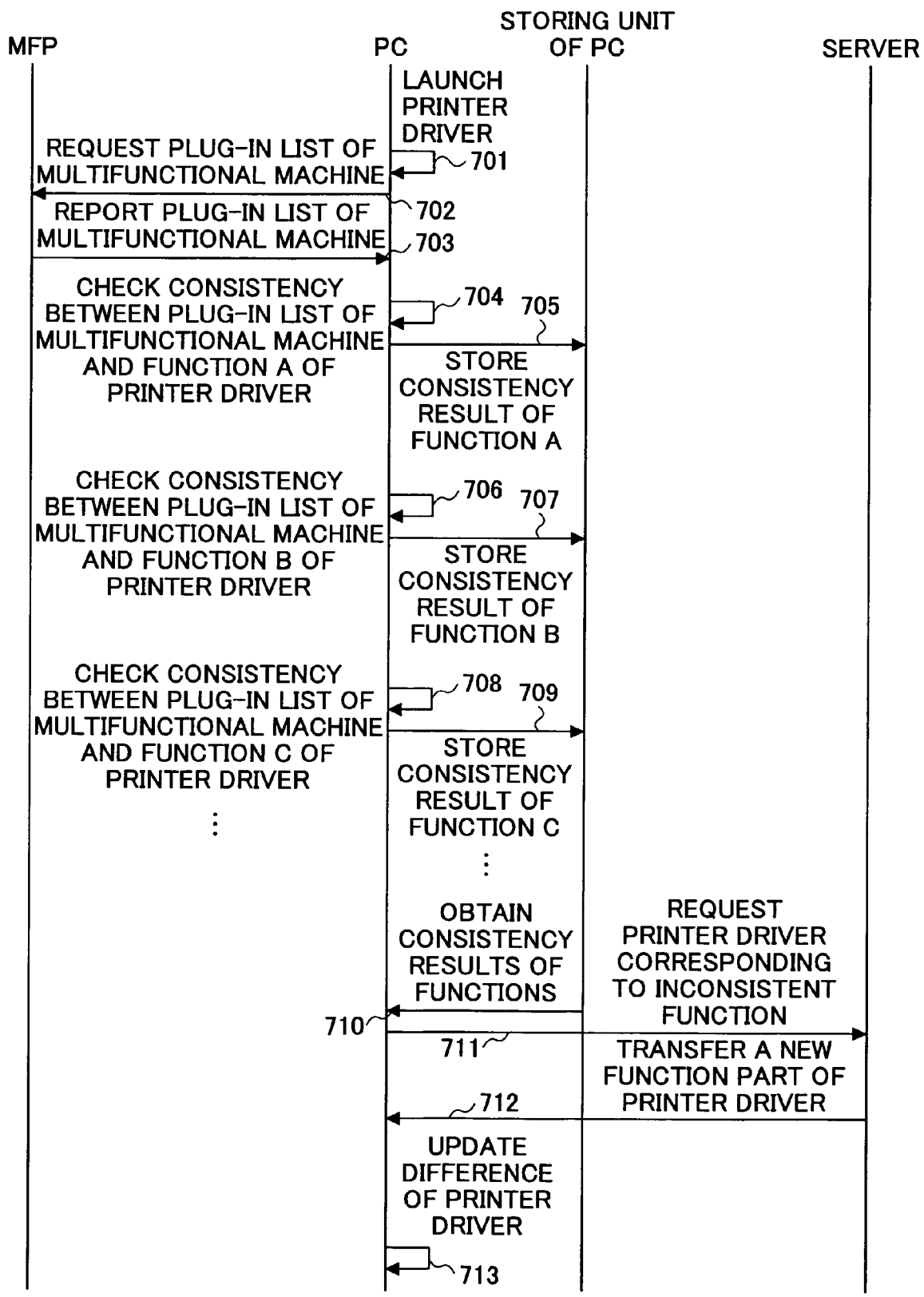
FIG. 7 is a sequence chart for explaining a fourth example of operation in an embodiment of the present invention.

FIG. 7 is a sequence chart for explaining a third example of processing operation in this embodiment. The operation is described with reference to FIG. 7 in the following. In this case, the printer driver itself is stored and managed in the server.

(1) First, the user instructs the own PC to perform printing in order to cause the multifunctional machine to perform printing so that the printer driver is launched (sequence 701).

(2) When the printer driver is launched, the PC sends, to the multifunctional machine, a request for a plug-in list of currently plugged-in functions in the multifunctional machine to check whether update of the functions has been performed (sequence 702).

(3) When the multifunctional machine receives the request for the plug-in list from the PC, the multifunctional machine sends the plug-in list in the multifunctional machine to the PC, where the plug-in list includes versions: Ver 1, Ver 2, Ver 2, Ver 3, Ver 3, and Ver 1 of the functions A-F in the multifunctional machine as described in FIG. 3 (sequence 703).

(4) When the PC receives the lug-in list from the multifunctional machine, the PC compares the plug-in list with each function of the printer driver currently installed in the PC in order beginning with the function A, so as to check whether they are consistent, that is, whether the versions of corresponding functions are the same, or whether the version of the function of the PC is newer than the version of the corresponding function of the multifunctional machine (sequences 704, 706, 708, . . . ).

(5) When there is an inconsistent function as a result of the checking in sequences 704, 706 and 708, the PC stores information indicating that there is inconsistency into the storing unit in the PC. In the case shown in FIG. 3, since the functions B, D and E are inconsistent with the corresponding functions, these functions are stored as being inconsistent (sequences 705, 707, 709, . . . ).

(6) In the aforementioned processing, the PC performs comparison for every function and stores inconsistent functions in the storing unit. After that, the PC obtains information on the stored inconsistent functions (sequence 710).

The operation described so far is the same as the case of the sequences 601-610 described in FIG. 6.

(7) After that, the PC requests the server to transfer a program for plugging-in a difference corresponding to the inconsistent functions in the printer driver (sequence 711).

(8) When the server receives the request in the sequence 711, the server sends, to the PC, the program for plugging-in new function as the difference corresponding to the inconsistent functions in the printer driver (sequence 712).

(9) The PC updates the printer driver in the PC using the transferred program (sequence 713).

According to the aforementioned processing, the PC used by the user accesses the server 11 so as to obtain the printer driver from the server 11, so that the PC can updates the printer driver in the PC.

Figure 8:
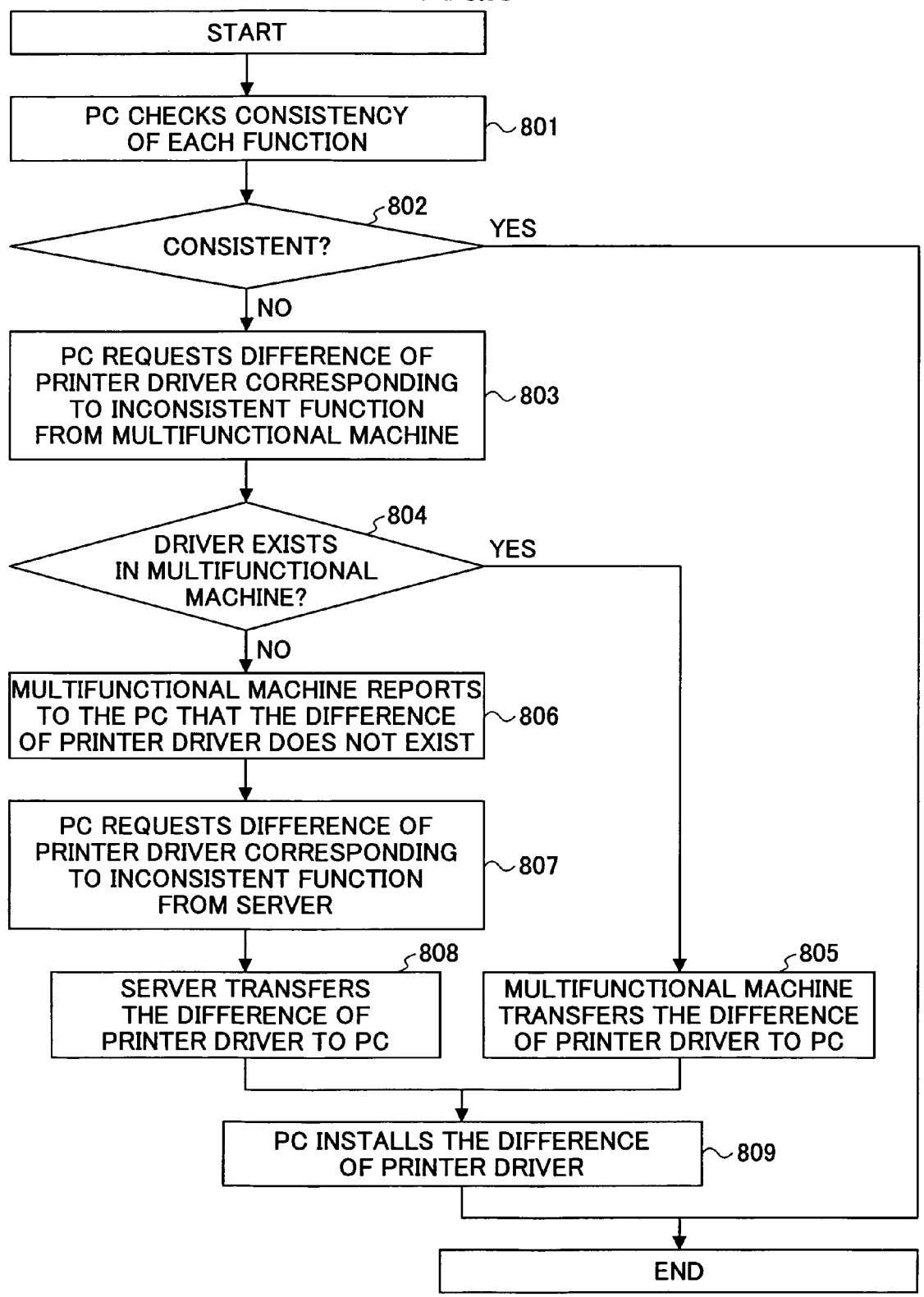
FIG. 8 is a sequence chart for explaining a fifth example of operation in an embodiment of the present invention.

FIG. 8 is a flowchart for explaining a fifth example of operation in this embodiment. The operation is described with reference to FIG. 8 in the following.

(1) First, the PC checks consistency between the printer driver of the own PC and functions of the multifunctional machine. This processing is performed in the same way as the sequences up to 409, 509, 609 and 709 in FIGS. 4-7 (step 801).

(2) As a result of checking for the consistency in the step 801, when there is consistency between them, the processing ends (step 802).

(3) In the determination in step 802, when there is an inconsistent function, the PC requests from the multifunctional machine a difference corresponding to the inconsistent function of the printer driver (step 803).

(4) When the multifunctional machine receives the request in step 803, the multifunctional machine determines whether the requested printer driver exists in the multifunctional machine. When the requested printer driver exists, the multifunctional machine sends the difference of the printer driver in the own multifunctional machine to the PC (steps 804, 805).

(5) In step 804, when the requested printer driver does not exist in the multifunctional machine, the multifunctional machine reports to the PC that the difference of the printer driver does not exist in the multifunctional machine (step 806).

(6) When the PC receives the report that the difference of the printer driver does not exist in the multifunctional machine in step 806, the PC requests the difference corresponding to the inconsistent function of the printer driver from the sever (step 807).

(7) When the server receives the request from the PC in step 807, the server sends the difference of the printer driver managed in the own server (step 808).

(8) When the PC receives the difference of the printer driver sent by the processing in step 805 or 808, the PC installs the difference into the own PC and ends the processing (step 809).

According to the aforementioned processing, the PC can install the plug-in program without knowing whether the plug-in program exists in the multifunctional machine or in the server beforehand.

Figure 9:
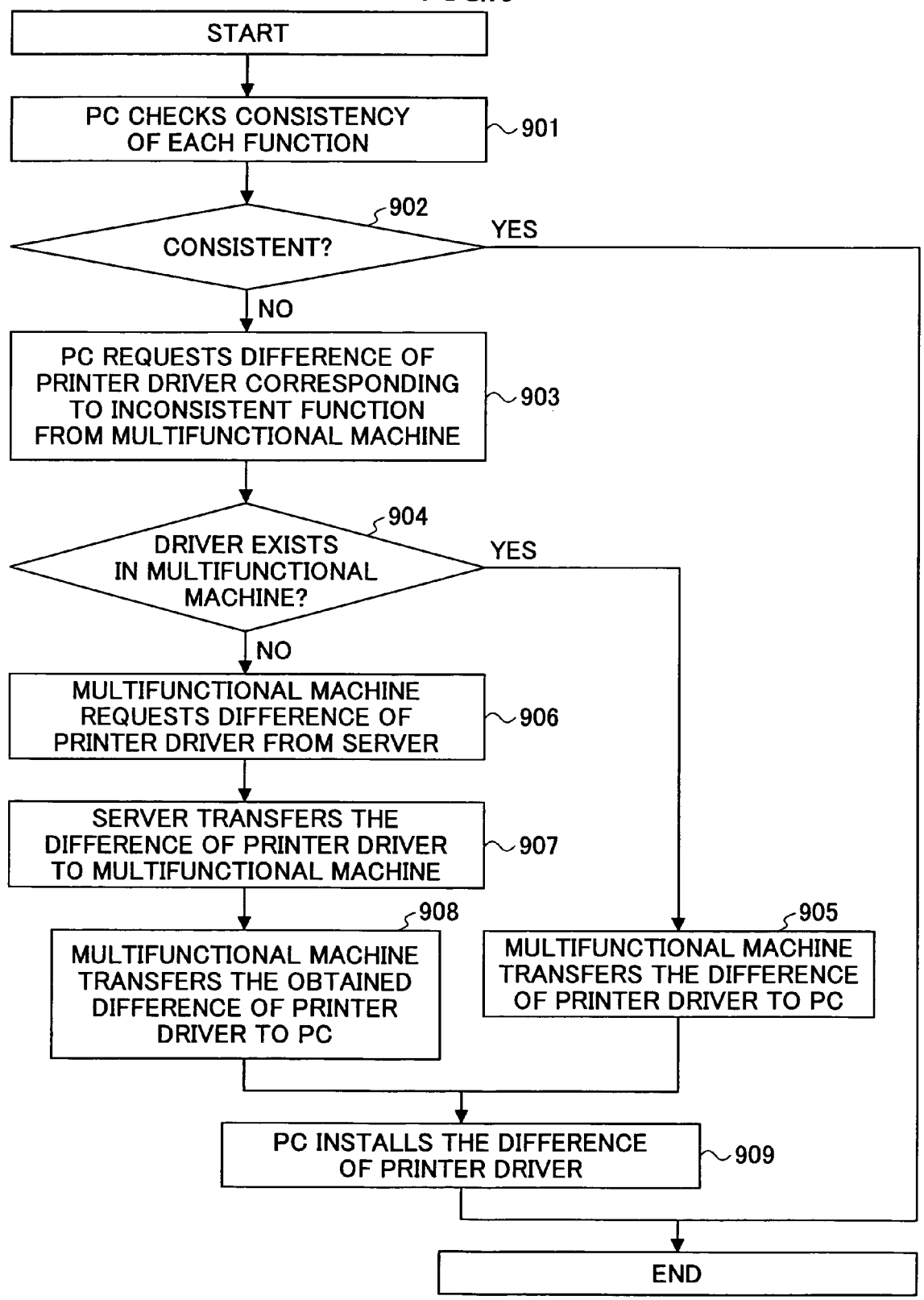
FIG. 9 is a sequence chart for explaining a sixth example of operation in an embodiment of the present invention.

FIG. 9 is a flowchart for explaining a sixth example of operation in this embodiment of the present invention. The operation is described with reference to FIG. 9 in the following.

(1) First, the PC checks consistency between the printer driver of the own PC and functions of the multifunctional machine. This processing is performed in the same way as the sequences up to 409, 509, 609 and 709 in FIGS. 4-7 (step 901).

(2) As a result of checking of the consistency in the step 901, when there is consistency between them, the processing ends (step 902).

(3) In the determination in step 802, when there is an inconsistent function, the PC requests from the multifunctional machine a difference corresponding to the inconsistent function in the printer driver (step 903).

(4) When the multifunctional machine receives the request in step 903, the multifunctional machine determines whether the requested printer driver exists in the multifunctional machine. When the requested printer driver exists, the multifunctional machine sends the difference of the printer driver in the own multifunctional machine to the PC (steps 904, 905).

(5) In step 904, when the requested printer driver does not exist in the multifunctional machine, the multifunctional machine accesses a registered server so as to send to the server a request for the difference of the printer driver requested from the PC (step 906).

(6) When the server that stores the printer driver receives the request from the multifunctional machine in step 906, the server sends the difference of the requested printer driver to the multifunctional machine (step 907).

(7) When the multifunctional machine receives the difference of the printer driver from the server in step 907, the server sends the difference of the printer driver to the PC (step 908).

(8) When the PC receives the difference of the printer driver sent by the processing in step 905 or 908, the PC installs the difference into the own PC and ends the processing (step 909).

According to the aforementioned processing, the PC can install the plug-in program without knowing whether the plug-in program exists in the multifunctional machine or in the server beforehand.

The processing in the sequences and the flow in each embodiment can be realized using a program. The program can be executed by the CPU in the multifunctional machine, the PC or the server. In addition, the program can be provided by storing it into FD, CDROM, DVD or the like.

In embodiments described so far, the printer driver is updated in the terminal apparatus such as the PC. However, the present invention is not limited to performing update of the printer driver. For example, the present invention can be applied to updating other driver such as a scanner driver of a scanner included in the multifunctional machine. In addition, in embodiments described so far, a method for updating the plug-in is described. However, the present invention can be similarly applied to a case when a whole program is updated.

The present invention is not limited to the specifically disclosed embodiments, and variations and modifications may be made without departing from the scope of the present invention.

The present application contains subject matter related to Japanese patent application No. 2005-078937, filed in the JPO on Mar. 18, 2005, the entire contents of which are incorporated herein by reference.

What is claimed is:

1. A system including an image forming apparatus connected to a terminal apparatus via a network, the system comprising:

an input device, at the terminal apparatus, configured to receive an instruction to initiate a printing operation;

a first processor, at the terminal device, configured to launch a printer driver and automatically generate a request for a plug-in list based on the instruction to initiate the printing operation;

a first transfer unit, at the terminal device, configured to transfer the request for a plug-in list to the image forming apparatus;

a receiving unit, at the image forming apparatus, configured to receive the request for a plug-in list from the terminal apparatus;

a second transfer unit, at the image forming apparatus, configured to transfer the plug-in list in the image forming apparatus to the terminal apparatus in response to receiving the request for the plug-in list;

the first processor, at the terminal device, configured to compare the plug-in list received from the image forming apparatus with functions of the printer driver of the terminal device;

the first transfer unit, at the terminal device, configured to transfer a request for a plug-in to the image forming apparatus based on a result of the comparison;

the receiving unit, at the image forming apparatus, configured to receive the request for the plug-in from the terminal apparatus;

a second processor, at the image forming apparatus, configured to determine whether the plug-in is stored at a memory of the image forming apparatus in response to the received request for the plug-in;

a download unit, at the image forming apparatus, configured to download the plug-in from a management apparatus connected to the image forming apparatus when the second processor determines that the plug-in is not stored in the memory of the image forming apparatus without notifying the terminal apparatus that the plug-in is not stored in the memory of the image forming apparatus; and the second transfer unit, at the image forming apparatus, configured to transfer the plug-in received from the management apparatus to the terminal apparatus as a response to the received request for the plug-in.

2. The system as claimed in claim 1, further comprising:

an install unit, at the image forming apparatus, configured to install the plug-in downloaded by the download unit.

3. The system as claimed in claim 1, wherein the plug-in list includes information identifying a version of each of the plug-ins included in the list.

4. A method performed by an image forming apparatus and a terminal apparatus connected via a network, the method comprising:

receiving, at an input device of the terminal apparatus, an instruction to initiate a printing operation;

launching, by a first processor of the terminal apparatus, a printer driver, and automatically generating a request for a plug-in list based on the instruction to initiate the printing operation;

transferring, by a first transfer unit of the terminal apparatus, the request for a plug-in list to the image forming apparatus;

receiving, at a receiving unit of the image forming apparatus, the request for a plug-in list from the terminal apparatus;

transferring, by a second transfer unit of the image forming apparatus, the plug-in list in the image forming apparatus to the terminal apparatus in response to receiving the request for the plug-in list;

comparing, by the first processor of the terminal device, the plug-in list received from the image forming apparatus with functions of the printer driver of the terminal device;

transferring, by the first transfer unit of the terminal apparatus, a request for a plug-in to the image forming apparatus based on a result of the comparing;

receiving, by the receiving unit of the image forming apparatus, the request for the plug-in from the terminal apparatus;

determining, by a second processor at the image forming apparatus, whether the plug-in is stored at a memory of the image forming apparatus in response to the received request for the plug-in;

downloading, by a downloading unit of the image forming apparatus, the plug-in from a management apparatus connected to the image forming apparatus when it is determined that the plug-in is not stored in the memory of the image forming apparatus without notifying the terminal apparatus that the plug-in is not stored in the memory of the image forming apparatus; and transferring, by the second transfer unit at the image forming apparatus, the plug-in received from the management apparatus to the terminal apparatus as a response to the received request for the plug-in.

5. The method of claim 4, further comprising:

installing, by an install unit of the image forming apparatus, the plug-in downloaded from the management apparatus.

6. The method of claim 4, wherein the plug-in list includes information identifying a version of each of the plug-ins included in the list.

7. A system including an image forming apparatus connected to a terminal apparatus via a network, the system comprising:

the terminal apparatus including means for receiving an instruction to initiate a printing operation;

means for launching a printer driver and automatically generating a request for a plug-in list based on the instruction to initiate the printing operation;

means for transferring the request for a plug-in list to the image forming apparatus;

means for comparing a plug-in list received from the image forming apparatus with functions of a printer driver of the terminal device; and means for transferring a request for a plug-in to the image forming apparatus based on a result of the comparison, and the image forming apparatus including means for receiving the request for a plug-in list from the terminal apparatus;

means for transferring the plug-in list in the image forming apparatus to the terminal apparatus in response to receiving the request for the plug-in list;

means for receiving the request for the plug-in from the terminal apparatus;

means for determining whether the plug-in is stored at a memory of the image forming apparatus in response to the received request for the plug-in;

means for downloading the plug-in from a management apparatus connected to the image forming apparatus when the means for determining determines that the plug-in is not stored in the memory of the image forming apparatus without notifying the terminal apparatus that the plug-in is not stored in the memory of the image forming apparatus; and means for transmitting the plug-in received from the management apparatus to the terminal apparatus as a response to the received request for the plug-in.

8. The system of claim 7, wherein the image forming apparatus further comprises:

means for installing the plug-in downloaded from the management apparatus.

9. The system of claim 7, wherein the plug-in list includes information identifying a version of each of the plug-ins included in the list.

* * * * *